United States Patent [19]

Foster

[11] Patent Number: 5,335,706
[45] Date of Patent: Aug. 9, 1994

[54] ROTARY FORGED CURVED SIDE FLANGE FOR FIVE PIECE RIMS

[76] Inventor: William C. Foster, 205 Rosemary Ct., Creve Couer, Ill. 61611

[21] Appl. No.: 959,170

[22] Filed: Oct. 9, 1992

Related U.S. Application Data

[63] Continuation of Ser. No. 764,054, Sep. 23, 1991, abandoned, which is a continuation of Ser. No. 260,264, Oct. 20, 1988, abandoned.

[51] Int. Cl.$^5$ .............................................. B60B 25/04
[52] U.S. Cl. .................................. 152/410; 152/396; 301/35.3
[58] Field of Search ..................................... 301/95–98, 301/35.3; 152/396, 406, 410, 411

[56] References Cited

U.S. PATENT DOCUMENTS

| 3,143,377 | 8/1964 | Bulgrin et al. |
| 3,885,615 | 5/1975 | Mitchell ........................ 152/411 |
| 4,341,425 | 7/1982 | Streicher et al. |
| 4,363,347 | 12/1982 | Baumgartner .................. 152/411 |
| 4,770,220 | 9/1988 | Mori. |

FOREIGN PATENT DOCUMENTS

| 1944671 | 8/1966 | Fed. Rep. of Germany. |
| 1235172 | 2/1967 | Fed. Rep. of Germany. |
| 2554382 | 8/1977 | Fed. Rep. of Germany. |
| 490754 | 8/1938 | United Kingdom. |
| 2059298 | 4/1981 | United Kingdom. |
| 2067482 | 7/1981 | United Kingdom .......... 152/409 |

OTHER PUBLICATIONS

Article from the periodical "Automobiltechnische Zeitschrift", 1982, pp. 39–44.

*Primary Examiner*—Russell D. Stormer
*Attorney, Agent, or Firm*—Richards, Medlock & Andrews

[57] ABSTRACT

A continuous forged annular flange (10) is provided for use in a wheel assembly (12) to support the side wall of a tire (14). The continuous forged flange eliminates butt welds used in prior designs which formed points for stress concentration. Further, the flange need not be cold worked and therefore has no induced stresses as present in prior designs which can lead to fatigue failure. In addition, the flange can be of a metal different than other parts of the wheel assembly to reduce electrolytic corrosion.

11 Claims, 1 Drawing Sheet

ROTARY FORGED CURVED SIDE FLANGE FOR FIVE PIECE RIMS

This application is a continuation of application Ser. No. 764,054 filed on Sep. 23, 1991, now abandoned which is a continuation of application Ser. No. 260,264 filed on Oct. 20, 1988, now abandoned.

TECHNICAL FIELD

This invention relates to an improved flange for a wheel rim particularly effective for radial tires.

BACKGROUND OF THE INVENTION

A wheel assembly mounting a tire on a large vehicle, such as used in construction, is commonly formed of multiple pieces. One such piece is the annular flange which supports a side wall of the tire. The flanges, in turn, are mounted on the wheel rim. Currently, these flanges are made from flat or curved section straight bars butt welded together and then formed in a cold forming operation. The butt welds connecting the pieces to form the flange typically run radially from the inner diameter to the outer diameter of the ring relative to the rotational axis of the wheel assembly.

The present design has a number of shortcomings, including a relatively short service life for the flange and rim and excessive wear problems on the side wall of the tire, particularly when using radial tires having very flexible side walls. The use of radial tires puts greater local stresses on the flange, which generates cracks running radially near the butt welds from stress concentrations at the welds. The residual stress concentrations induced in the pieces by forming the pieces during cold forming operations create circumferential cracks about the rim from fatigue. These problems are accentuated as the flanges are typically made of low carbon steel, as are the other pieces of the wheel assembly, which creates an electrolytic corrosion action at the inner face between the side of the flange and the rim, causing excessive wear of the flange and rim. Further, the surface of the flange in contact with the tire sidewall is typically the "as rolled corner" of the raw material bars used to form it, and, as such, commonly forms a rough surface which creates excessive wear on the side wall of the tire, or even cutting of the side wall.

SUMMARY OF THE INVENTION

In accordance with one aspect of the present invention, a flange is provided for a wheel assembly. The flange is a continuous annular forged member formed of a material different than the adjacent parts of the wheel assembly to reduce electrolytic corrosion action therebetween.

In accordance with another aspect of the present invention, a flange for a wheel assembly is provided which comprises a continuous annular forged member which is free from induced stresses due to cold working operations and from butt welds.

In accordance with another aspect of the present invention, the continuous annular forged flange has a continuous radius of, in one embodiment, 90°, and in another embodiment, 150°, to reduce the side wall wear on the tire supported by the flange and provide greater structural strength to the flange.

BRIEF DESCRIPTION OF THE DRAWINGS

With reference now to the following Detailed Description, taken in conjunction with the accompanying drawings, wherein.

DETAILED DESCRIPTION

Figure 1:
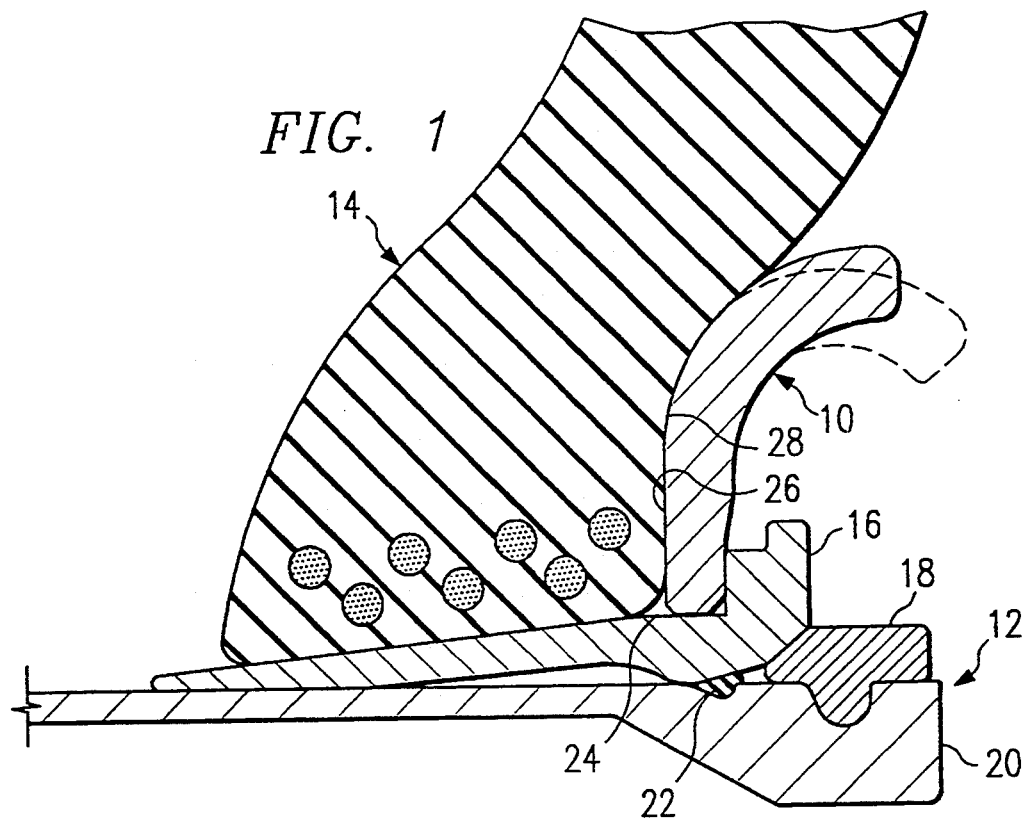
FIG. 1 illustrates a cross section of a wheel assembly and tire incorporating a flange constructed in accordance with the teachings of the present invention.

With reference now to the drawings, wherein like reference characters designate like or corresponding parts throughout the several views, a flange 10 forming a first embodiment of the present invention is illustrated.

The flange 10 forms part of a wheel assembly 12 which mounts a tire 14 thereon. The vehicle using such a wheel assembly 12 and tire 14 would typically be a large industrial vehicle, such as a offroad grader or dump vehicle.

As seen in FIG. 1, the wheel assembly 12 is an assemblage of components, including flange 10, member 16, member 18 and member 20. The members and flange are held together by suitable welds 22, 24 to form the completed wheel assembly. As can be seen in FIG. 1, the inner surface 26 of the flange 10 supports the side wall 28 of the tire 14. In so doing, significant forces are exerted by the tire on the flange, particularly when the tire is a radial tire with great flexibility in the side wall.

Figure 2:
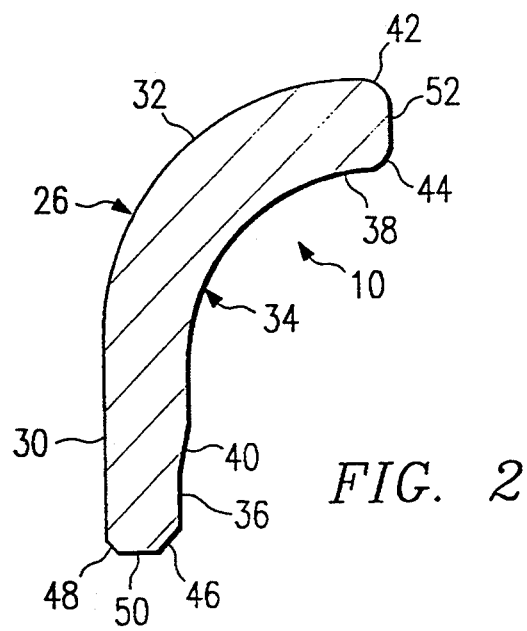
FIG. 2 is a cross sectional view of the flange in FIG. 1.

With reference now to both FIGS. 1 and 2, the flange 10 can be seen to be a continuous annular member formed by a forging process to eliminate the necessity for butt welds and eliminating induced stresses generated by cold working such as done in prior designs. To manufacture flange 10, a pierced billet, typically of steel, is heated to forging temperatures and then rolled into an annular shape of ever increasing diameter by an eccentric ring roller until the desired final diameter is achieved. The rolled annular forged ring is then again reheated to forging temperatures and press forged to obtain the section configuration as seen in the FIGURES. The seamless forging of flange 10 allows use of high strength materials for the flange different than the materials of members 16, 18 and 20, which are most typically made of low carbon steel. The use of such dissimilar metals reduces the severity of electrolytic corrosion between the members which has, in previous designs, led corrosion on the inner surface of a flange which, in turn, generates significant wear in the side wall of the tire.

With reference to FIG. 2, the cross sectional configuration of the flange 10 can be described. The inner surface 26 comprises a inner cylindrical surface 30 and a curved surface 32. The inner cylindrical surface should be 100% machine cleaned while surface 32 does not require machining, but must be smooth and free of nicks and tears.

The outer surface 34 of the flange is formed of an outer cylindrical surface 36, a curved surface 38, and an interposed ramp surface 40. The notch formed by the cylindrical surface 36 and ramp surface 40 facilitates the positioning and securing of the flange 10 on member 16. The edges 42, 44, 46 and 48 at ends 50 and 52 of the flange 10 are rounded to eliminate sharp boundaries creating points of stress concentration.

In one flange constructed in accordance with the teachings of the present invention, the outermost diameter of the flange, at edges 42, was about 61 inches. The inner diameter of the flange, defined by inner end surface 50, was about 51 inches. The length of outer cylindrical surface 36 was about 1 inch, while the ramp surface 40 sloped at a 10° angle relative to surface 36. The radius of the outer curved surface 38 was about 2 inches. The radius of the inner curved surface 32 was about 2¾ inches. The thickness of the flange 10 between surface 30 and 36 is about 1 inch, which increases to about 1.12 inches at the top of ramp surface 40. Commonly, the advantages of the present invention are well suited for flanges with inner diameters from 25 inches to 57 inches.

While one embodiment of the present invention has been described in detail herein and shown in the accompanying drawings, it will be evident that further modifications or substitutions of parts and elements are possible without departing from the scope and spirit of the invention.

I claim:

1. In a multiple piece rim for mounting a tire on a large industrial vehicle to support a portion of the weight of the vehicle, the tire having a sidewall, the multiple piece rim including a flange, an intermediate member mating with the flange, an inner member mating with the intermediate member and an interposed member between the intermediate member and the inner member, the flange having an inner surface in contact with the side wall of a tire mounted on the multiple piece rim, a portion of the inner surface being an annular surface and a portion of the inner surface being curved, the improvement comprising the flange being formed by rolling and forging a continuous annular member in one piece having no ends joined by welding.

2. The multiple piece rim of claim 1 for use in mounting a radial tire.

3. The multiple piece rim of claim 1 wherein the curved portion assists in supporting the side wall of the tire.

4. The multiple piece rim of claim 1 wherein the improvement further comprises the curved portion being 90°.

5. The multiple piece rim of claim 1 wherein the improvement further comprises the curved portion being 150°.

6. The multiple piece rim of claim 1 wherein the improvement further comprises said flange being formed of high strength steel.

7. The multiple piece rim of claim 1 wherein the improvement further comprises the flange having an inner diameter, the inner diameter being selected from the range including from about 25" to 57".

8. The multiple piece rim of claim 1 wherein the improvement further comprises the flange having edges, the edges being rounded to eliminate sharp boundaries creating points of stress concentration.

9. The multiple piece rim of claim 1 wherein the improvement further comprises the flange further including an outer surface formed of an outer cylindrical surface, an outer curved surface, and an interposed ramp surface between the outer cylindrical surface and outer curved surface, a notch being formed thereby, the notch facilitating the positioning and securing of the flange on the multiple piece rim.

10. The multiple piece rim of claim 1 wherein the rim is a five-piece rim.

11. The multiple piece rim of claim 1 wherein the improvement further comprises the flange being formed from a pierced billet heated to forging temperatures and rolled into an increasing diameter by an eccentric ring roller, with the flange then reheated to forging temperatures and press forged to obtain a final section configuration.

* * * * *